United States Patent [19]

Watanuki

[11] Patent Number: 4,733,141
[45] Date of Patent: Mar. 22, 1988

[54] HORIZONTAL OUTPUT CIRCUIT FOR CORRECTING PIN CUSHION DISTORTION OF A RASTER

[75] Inventor: Kiyoshi Watanuki, Yokohama, Japan
[73] Assignee: Hitachi, Ltd., Tokyo, Japan
[21] Appl. No.: 5,238
[22] Filed: Jan. 20, 1987
[30] Foreign Application Priority Data Jan. 20, 1986 [JP] Japan .................... 61-7912

[51] Int. Cl.⁴ ............................. H01J 29/56
[52] U.S. Cl. ....................... 315/371; 315/408
[58] Field of Search ......................... 315/371, 408

[56] References Cited

U.S. PATENT DOCUMENTS 4,242,714 12/1980 Yoshida et al. ............... 315/371
4,254,365 3/1981 Knight ........................... 315/371

Primary Examiner—Theodore M. Blum
Attorney, Agent, or Firm—Antonelli, Terry & Wands

[57] ABSTRACT

In a horizontal output circuit for a cathode ray tube, there is included a second resonant circuit combining in parallel a transistor, a damper diode, a resonant capacitor and a series connection of a capacitor and a coil serially connected to a horizontal deflection resonant circuit having a horizontal output transistor, a damper diode, a resonant capacitor, a series connection of an S-shape capacitor and a horizontal deflection coil and a flyback transformer. The constants of the circuits are set so that waveforms of resonant pulses generated by the two resonant circuits becomes similar. A parabolic correction voltage for vertical synchoronization is also applied to the second resonant circuit and the resonant pulse is amplitude-modulated parabolically by the vertical synchronization signal. Therefore, the resonant pulse of the first resonant circuit is amplitude-modulated parabolically with a reverse polarity. A current flowing into the horizontal deflection coil in the first resonant circuit is amplitude-modulated parabolically with a reverse polarity with that of the second resonant circuit and thereby right and left pin cushion distortion of raster can be corrected.

11 Claims, 4 Drawing Figures

U.S. Patent  Mar. 22, 1988  4,733,141
FIG. 1
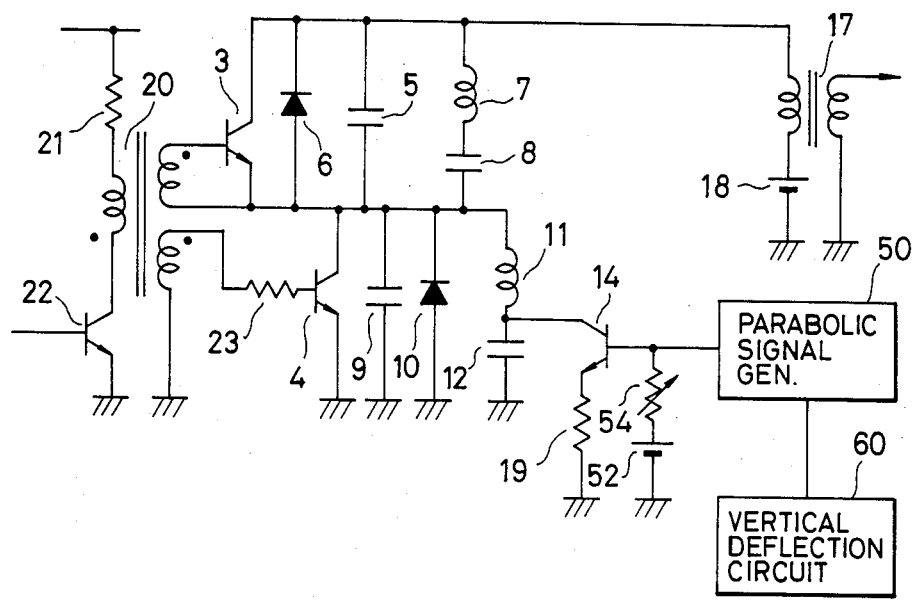
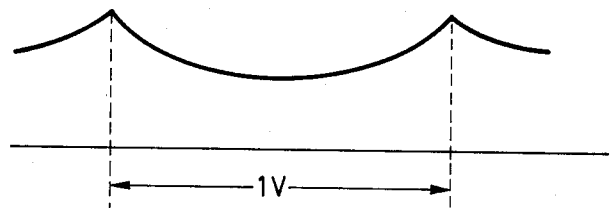
FIG. 2(a)
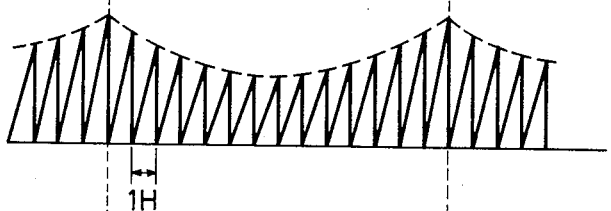
FIG. 2(b)
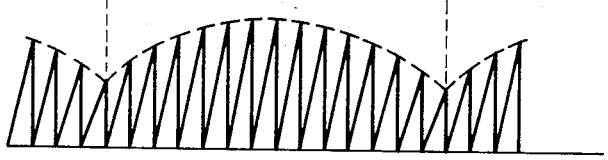
FIG. 2(c)

HORIZONTAL OUTPUT CIRCUIT FOR CORRECTING PIN CUSHION DISTORTION OF A RASTER

BACKGROUND OF THE INVENTION

The present invention relates to a horizontal output circuit for a cathode ray tube, and more particularly to a horizontal output circuit for correcting pin cushion distortion of a raster.

An example of a conventional horizontal output circuit for correcting pin cushion distortion is described in U.S. Pat. No. 3,906,305. The circuit of the prior art comprises a horizontal resonant circuit and a second resonant circuit connected thereto in series comprising a resonant capacitor, a damper diode, a coil and a charging capacitor. These two resonant circuits are driven by a single horizontal deflection transistor. A parabolic voltage for vertical synchronization is applied across a coil and a capacitor of the second resonant circuit and a current of the second resonant circuit is modulated parabolically. Therefore, a current flowing through the horizontal deflection coil of the first resonant circuit is amplitude-modulated parabolically in the reverse polarity, thereby correcting the right and left pin cushion distortion. According to such a conventional circuit, it is necessary that a voltage in accordance with the degree of correction of the right and the left pin cushion distortion is accummulated in by the charging capacitor of the second resonant circuit. Therefore, the circuit of the prior art has a disadvantage in that the value of the coil inductance of the second resonant circuit must be large.

SUMMARY OF THE INVENTION

It is an object of the present invention to provide a horizontal output circuit for correcting the right and left pin cushion distortion of a raster.

The second resonant circuit according to the present invention comprises a transistor which is driven in phase with the horizontal output transistor, a damper diode, a resonant capacitor, a series connection of coil and a charging capacitor is connected in series to the first resonant circuit (horizontal deflection circuit) comprising said horizontal output transistor, a damper diode, a resonant capacitor, a horizontal deflection coil, an S-character correction capacitor and a flyback transformer.

Since the transistors of both the horizontal deflection circuit and that of the second resonant circuit are driven in almost the same phase, current or voltage waveforms of these respective circuits are similar.

A parabolic vertical synchronization signal is applied as a correction signal to the charging capacitor of the second resonant circuit and a voltage of the second resonant circuit is amplitude modulated in parabolically on the basis of the vertical synchronization. A power supply voltage is equal to the sum of the voltage of the first resonant circuit and the voltage of the second resonant circuit.

The voltage of the first resonant circuit is amplitude-modulated parabolically in the reverse polarity. Since an amplitude of a current flowing into the horizontal deflection coil is modulated parabolically on the basis of horizontal synchronization with reverse polarity, the right and left pin cushion distortion of the raster can thus be corrected.

BRIEF DESCRIPTION OF THE DRAWINGS

FIG. 1 is a circuit diagram which illustrates an embodiment of the present invention.

FIGS. 2a–2c show current and voltage waveforms at respective points of the circuit of FIG. 1.

DESCRIPTION OF THE PREFERRED EMBODIMENT

As shown in FIG. 1, a horizontal output transistor 3 and a distortion correction transistor 4 are driven by a horizontal drive transistor 22 through a transformer 20. Both, the horizontal output transistor 3 and the distortion correction transistor 4 are turned ON simultaneously. Since a resistor is connected to the base of distortion correction transistor 4, the distortion correction transistor 4 is turned OFF prior to that of the horizontal output transistor 3. Charges are thereby accumulated in a capacitor 9 via the collector-emitter current path of the horizontal output transistor 3 while it remains conducting subsequent to when the distortion correction transistor 4 turns OFF. As a result, the energy level applied to the second resonant circuit becomes sufficiently greater in comparison with that of the circuit of the prior art. Even when the coil inductance of the second resonant circuit is smaller than that of the prior art, the necessary correction voltage level can be obtained. After the transistors 3 and 4 both turn OFF, resonance occurs respectively at the first resonant circuit consisting of the S-character correction capacitor 8, deflection coil 7 and resonant capacitor 5 and at the second resonant circuit consisting of the capacitor 12, coil 11 and capacitor 9. Similar pulse waveforms can be obtained during resonance of both the first and the second resonance circuits by accordingly selecting the respective values of the coil and capacitor of both resonant circuits so that the resonant frequency of both circuits is equal.

In such a circuit, a parabolic signal generating circuit 50 is connected and thereby a parabolic signal is generated and combined with the sawtooth wave for vertical synchronization which is accumulated in capacitor 12 of the second resonant circuit and is sent from the vertical circuit 60. The voltage accummulated in the capacitor 12 is amplitude-modulated by a parabolic voltage for vertical synchronization shown in FIG. 2(a). Therefore, a current flowing into the second coil 11 is also modulated by the vertical synchronization signal shown in FIG. 2(b). Respective voltages across capacitors 8 and 12 are obtained by effectively dividing the power supply voltage 18 such that their sum is always constant. When the the voltage across one of the capacitors 8 and 11 increases, the voltage across the other decreases. Accordingly, the voltage generated across capacitor 8 is amplitude-modulated by the parabolic voltage of a reverse polarity for vertical synchronization. The resonant current of each resonant circuit depends on the voltage across capacitors 8 and 12 and, therefore, the amplitude of the horizontal deflection current flowing into the horizontal deflection coil 7 is modulated parabolically by the vertical synchronization signal as shown in FIG. 2(c) and it can be used as the appropriate right and left pin cushion distortion correction current.

According to another embodiment of the present invention, a DC voltage is applied to the capacitor 12 as a correction signal and the DC voltage that is sent from the DC voltage generating circuit 52, 54 is added to or subtracted from the votlage across capacitor 12. When a voltage of the second resonant circuit increases or decreases, a voltage of the first resonant circuit also decreases or increases, respectively. Thereby, correction of horizontal size of the raster can be realized.

In still another embodiment of the present invention, a voltate voltage combining the DC voltage sent from the combination of the DC voltage generating circuit 52, 54 and the parabolic voltage is applied to the capacitor 12. This circuit simultaneously realizes the correction of the horizontal size of the raster as well as the correction of the right and left pin cushion distortion of the raster.

According to the present invention, the sum of the pulse voltages generated across the capacitors 5 and 9 of the first and second resonant circuits remains constant and the primary voltage and secondary voltage of the flyback transformer 17 are also constant. Therefore, such voltages do not adversely effect the high voltage of cathode ray tube generated at the secondary side of the flyback transformer.

According to the present invention, the right and left pin cushion distortion can be corrected without adversely effecting the high voltage. Moreover, even when the coil of the secondary resonant circuit is small in size, the secondary resonant circuit can still obtain the voltage required for correction of distortion in the raster.

I claim:

1. A horizontal output circuit for a cathode ray tube comprising:
   a horizontal deflection coil;
   an S-shape capacitor connected in series with said horizontal deflection coil;
   a horizontal output transistor and a switching transistor connected in series and being responsive to a control means, said horizontal output transistor being connected in parallel with the series circuit of said horizontal deflection coil and said S-shape capacitor for timely producing a horizontal deflection current through said horizontal deflection coil;
   a second capacitor connected in parallel with said series circuit for resonating with said series circuit during the time said horizontal output transistor is non-conducting;
   a DC voltage source having first and second ends;
   a third capacitor having a first end coupled to a first end of said series circuit and wherein the second end of each of said series circuit and said third capacitor being operatively coupled to the first and second ends of said DC voltage source, respectively;
   a fourth capacitor connected between one end of said series circuit and said second end of said DC voltage source;
   said switching transistor being connected between said one end of said series circuit and said other end of said DC voltage source and alternately turning on and off in response to said control means, wherein said horizontal output transistor and said switching transistor are switched into the conducting state approximately simultaneously, and also the time at which said switching transistor is turned off by said control means precedes the turn-off time of said horizontal output transistor;
   a current source operatively connected in parallel with said third capacitor, including a control terminal, for producing an output current having an amplitude which is responsive to a control signal supplied to said control terminal; and
   a signal generator for generating a parabolic signal of a vertical frequency to be supplied to said control terminal of said current source, thereby effecting a voltage across said third capacitor with an amplitude which is modulated parabolically.

2. A horizontal output circuit according to claim 7, wherein said current source further comprises a resistor connected between the emitter of said transistor and the second end of said DC voltage source.

3. A horizontal output circuit according to claim 6, wherein said current source further comprises a resistor connected between the emitter of said transistor and the second end of said DC voltage source.

4. A horizontal output circuit according to claim 1, wherein said DC voltage source first end being coupled to said first end of said series circuit via the primary winding of a flyback transformer.

5. A horizontal output circuit according to claim 5, further comprising a second coil connected between said one end of said series circuit and said one end of said third capacitor.

6. A horizontal output circuit according to claim 5, wherein said current source comprises a transistor having a collector-emitter current path connected across said third capacitor and a base electrode connected to said signal generator.

7. A horizontal output circuit according to claim 6, further comprising a variable DC source for biasing said base electrode of said transistor with a variable voltage level.

8. A horizontal output circuit for a cathode ray tube for correcting pincushion distortion of a raster comprising:
   a horizontal resonant circuit, including
   a horizontal deflection coil,
   a flyback transformer,
   an S-shape capacitor connected in series with said horizontal deflection coil,
   a horizontal output transistor being connected in parallel with the series circuit of said horizontal deflection coil and said S-shape capacitor and being responsive to a control circuit for timely producing a horizontal deflection current through said horizontal deflection coil, and
   a second capacitor connected in parallel with said series circuit for resonating with said series circuit during the time said horizontal output transistor is non-conducting;
   a DC voltage source having first and second ends;
   a second resonant circuit, including
   a third capacitor having a first end coupled to a first end of said series circuit via a second coil and wherein the second end of said series circuit being coupled to the first end of said DC voltage source via the primary winding of said flyback transformer and the second end of said third capacitor being coupled to the respective second end of said DC voltage source,
   a fourth capacitor connected between one end of said series circuit and said second end of said DC voltage source,
   a switching transistor connected in series with said horizontal output transistor and being connected between said one end of said series and said other end of said DC voltage source and alternately turning on and off in response to said control circuit, wherein said horizontal output transistor and said switching transistor are switched into the conducting state approximately simultaneously, and also the time at which said switching transistor is turned off by said control means precedes the turn-off time of said horizontal output transistor; and a parabolic correction circuit, including a current source operatively connected in parallel with said third capacitor, including a control terminal, for producing an output current having an amplitude which is responsive to a control signal supplied to said control terminal, and a signal generator for generating a parabolic signal of a vertical frequency to be supplied to said control terminal of said current source, thereby effecting a voltage across said third capacitor with an amplitude which is modulated parabolically and in a current flowing into the horizontal deflection coil in the horizontal resonant circuit which is amplitude-modulated parabolically and in reverse polarity to that flowing in said second coil.

9. A horizontal output circuit according to claim 8, wherein said current source comprises a transistor having a collector-emitter current path connected across said third capacitor and a base electrode connected to said signal generator.

10. A horizontal output circuit according to claim 9, wherein said current source further comprises a resistor connected between the emitter of said transistor and the second end of said DC voltage source.

11. A horizontal output circuit according to claim 9, further comprising a variable DC source for biasing said base electrode of said transistor with a variable voltage level.

* * * * *